(12) United States Patent
Orgill (10) Patent No.: US 10,785,666 B2
(45) Date of Patent: Sep. 22, 2020

(54) WIRELESS RAW PACKET SENSING AND INJECTION SYSTEMS AND METHODS FOR TARGETED COMMUNICATIONS

(71) Applicant: Jason P. Orgill, Belmont, MA (US)

(72) Inventor: Jason P. Orgill, Belmont, MA (US)

( * ) Notice: Subject to any disclaimer, the term of this patent is extended or adjusted under 35 U.S.C. 154(b) by 144 days.

(21) Appl. No.: 15/430,636

(22) Filed: Feb. 13, 2017

(65) Prior Publication Data

US 2017/0238200 A1 Aug. 17, 2017

Related U.S. Application Data

(60) Provisional application No. 62/294,648, filed on Feb. 12, 2016.

(51) Int. Cl.
*H04W 24/08* (2009.01)
*H04L 12/26* (2006.01)
*H04W 84/12* (2009.01)

(52) U.S. Cl.
CPC ............. *H04W 24/08* (2013.01); *H04L 43/00* (2013.01); *H04W 84/12* (2013.01)

(58) Field of Classification Search
CPC .................................................. H04W 24/08
USPC ....................................................... 370/352
See application file for complete search history.

(56) References Cited

U.S. PATENT DOCUMENTS

| 7,953,851 | B2 | 5/2011 | Britton et al. | |
| 8,214,486 | B2 | 7/2012 | Britton et al. | |
| 8,478,862 | B2 | 7/2013 | Britton et al. | |
| 8,510,431 | B2 | 8/2013 | Britton et al. | |
| 2005/0195753 | A1* | 9/2005 | Chaskar ................ | H04W 8/005 370/254 |
| 2006/0007870 | A1* | 1/2006 | Roskowski ............. | H04L 43/00 370/252 |
| 2007/0195742 | A1* | 8/2007 | Erdman .................. | H04L 47/10 370/338 |
| 2009/0216882 | A1* | 8/2009 | Britton ................... | H04L 43/00 709/224 |
| 2017/0127304 | A1* | 5/2017 | Britt ....................... | H04W 24/08 |
| 2017/0141974 | A1* | 5/2017 | Lahiri ................... | H04L 43/028 |
| 2017/0195903 | A1* | 7/2017 | Chandra ................ | H04L 69/02 |
| 2017/0272532 | A1* | 9/2017 | Lynch .................... | H04L 69/22 |

* cited by examiner

*Primary Examiner* — Shripal K Khajuria
(74) *Attorney, Agent, or Firm* — Clements Bernard Walker; Lawrence A. Baratta, Jr.

(57) ABSTRACT

Monitoring and injection systems and methods for targeted communications over a wireless network include sensing traffic over the wireless network to identify clients thereon and observe activity on the wireless network; analyzing the traffic based on the sensing and an analysis engine to determine an injection of a targeted communication for a client; and injecting the targeted communication as a raw packet over the wireless network to the client. The method can also include sensing a request from the client; determining the injection responsive to the request; and constructing the raw packet in response to the request such that the raw packet is received prior to a response to the request.

20 Claims, 5 Drawing Sheets

WIRELESS RAW PACKET SENSING AND INJECTION SYSTEMS AND METHODS FOR TARGETED COMMUNICATIONS

CROSS-REFERENCE TO RELATED APPLICATION(S)

The present patent/application claims priority to U.S. Provisional Patent No. 62/294,648, filed Feb. 12, 2016, and entitled "Wireless Raw Packet Sensing and Injection Systems and Methods," the contents of which are incorporated by reference.

FIELD OF THE DISCLOSURE

The present disclosure generally relates to networking systems and methods. More particularly, the present disclosure relates to wireless raw packet sensing and injection systems and methods for targeted communications, namely to enable and augment new communication channels.

BACKGROUND OF THE DISCLOSURE

Wireless network usage is proliferating, and user device adoption continues to grow and evolve with smartphones, tablets, ultrabooks, laptops, and new emerging platforms and form factors. A typical use case of user devices and wireless networks includes connection to public hotspots. A hotspot is a physical location where user may obtain Internet access, typically using Wi-Fi technology, via a Wireless Local Area Network (WLAN) using a router connected to an Internet Service Provider (ISP). Public hotspots can be anywhere such as trade shows, conventions, airports, mass transportation centers, libraries, malls, sporting events, coffee houses, and the like. A WLAN infrastructure includes one or more Access Points (APs) and client devices (stations) operating in accordance with the IEEE 802.11 protocol specification (and variants thereof). This is the case with unlicensed spectrum in particular. When a user wishes to communicate with a WLAN station, then generally there must be prior connections made at several layers of the Open Systems Interconnection (OSI) model to enable this transaction. For example, if a client were to connect to a search engine via a Web browser, a WLAN connection from the station to the AP is made, to transmit Internet Protocol (IP) packets from the station to the router, which enables Transmission Control Protocol (TCP) packets with a Hypertext Transfer Protocol (HTTP) payload to be routed to a Web server and back. In this example, the IEEE 802.11, TCP/IP, and HTTP standards do not allow for out-of-band communication directly with the Web browser or application on the client device, even if a broadcast Media Access Control (MAC) or IP address is used. The standards also make it difficult for proprietary communication channels to be built using the same wireless technology (in this example IEEE 802.11 wireless interfaces).

There are circumstances where one may wish to communicate successfully with wireless devices outside the defined standard. Communicating outside of the standard on the sender's side could enable a standards-abiding end user to receive valuable announcements, or it could enable wireless devices to communicate outside of traditional network infrastructure pathways and standards.

BRIEF SUMMARY OF THE DISCLOSURE

In various exemplary embodiments, a monitoring and injection method for targeted communications over a wireless network includes sensing traffic over the wireless network to identify clients thereon and observe activity on the wireless network; analyzing the traffic based on the sensing and an analysis engine to determine an injection of a targeted communication for a client; and injecting the targeted communication as a raw packet in the presence of the wireless network to the client. The monitoring and injection method can further include sensing a request from the client; determining the injection responsive to the request; and constructing the raw packet in response to the request such that the raw packet is received prior to a response to the request. The raw packet can be an arbitrary message to a Web browser on the client when the Web browser is expecting a reply to a previously sent request. The analysis engine can perform analysis of historical client communications and client identity based on the sensing, tracking of past injection events, and present circumstance, and wherein the analysis is used to determine the injection for the client. The method can be performed by a monitoring and injection device in proximity to the wireless network, and the method can further include obtaining periodic configuration and synchronization data from one or more of a monitoring and injection server and another monitoring and injection device. The wireless network can operate according to IEEE 802.11 and the raw packet uses one or more of Hypertext Transfer Protocol (HTTP), Transmission Control Protocol (TCP), JavaScript, Domain Name System (DNS), User Datagram Protocol (UDP), and Hypertext Markup Language (HTML). The sensing can be performed by a monitoring and injection device in a monitor mode which senses the traffic on the wireless network as one or more of i) unencrypted, ii) encrypted with keys known by the monitoring and injection device, and iii) encrypted without the keys for the purposes of analytics. The sensing can include monitoring and tracking identifying information of the clients including one or more of Media Access Control (MAC) address, browsing history, Internet Protocol (IP) traffic history, and cookies. The raw packet can be a response to a Hypertext Transfer Protocol (HTTP) GET request for a specific element of a Web page, or the web page itself, wherein the response is determined by the analysis engine, and wherein the targeted communication is an interstitial ad on the Web page.

In another exemplary embodiment, a monitoring and injection device configured for targeted communications over a wireless network includes one or more wireless interfaces and a data store; a processor communicatively coupled to the one or more wireless interfaces and the data store; and memory storing instructions that, when executed, cause the processor to sense traffic over the wireless network, via the one or more wireless interfaces, to identify clients thereon and observe activity on the wireless network, analyze the traffic based on the sensed traffic and an analysis engine in communication with the data store to determine an injection of a targeted communication for a client, and cause injection of the targeted communication by the one or more wireless interfaces as a raw packet in the presence of the wireless network to the client. The memory storing instructions that, when executed, can further cause the processor to sense a request from the client; determine the injection responsive to the request; and construct the raw packet in response to the request such that the raw packet is received prior to a response to the request. The raw packet can be an arbitrary message to a Web browser on the client when the Web browser is expecting a reply to a previously sent request. The analysis engine can perform analysis of historical client communications and client identity based on the sensing, tracking of past injection events, and present circumstance, and wherein the analysis is used to determine the injection for the client. The monitoring and injection device is in proximity to the wireless network, and wherein the memory storing instructions that, when executed, can further cause the processor to obtain periodic configuration and synchronization data from one or more of a monitoring and injection server and another monitoring and injection device. The wireless network can operate according to IEEE 802.11 and the raw packet uses one or more of Hypertext Transfer Protocol (HTTP), Transmission Control Protocol (TCP), JavaScript, Domain Name System (DNS), User Datagram Protocol (UDP), and Hypertext Markup Language (HTML). The monitoring and injection device can be in a monitor mode which senses the traffic on the wireless network as one or more of i) unencrypted, ii) encrypted with keys known by the monitoring and injection device, and iii) encrypted without the keys to determine analytics. The traffic can be sensed by monitoring and tracking identifying information of the clients including one or more of Media Access Control (MAC) address, browsing history, Internet Protocol (IP) traffic history, and cookies. The raw packet can be a response to a Hypertext Transfer Protocol (HTTP) GET request for a specific element of a Web page, wherein the response is determined by the analysis engine, and wherein the targeted communication is an interstitial ad on the Web page.

In a further exemplary embodiment, a monitoring and injection system configured for targeted communications over one or more wireless networks includes one or more monitoring and injection devices deployed in proximity to the one or more wireless networks; and a monitoring and injection server in communication with the one or more monitoring and injection devices; wherein each of the one or more monitoring and injection devices are configured to sense traffic over the one or more wireless networks to identify clients thereon and observe activity on the one or more wireless networks, analyze the traffic based on the sensed traffic and an analysis engine to determine an injection of a targeted communication for a client, and cause injection of the targeted communication as a raw packet in the presence of the one or more wireless networks to the client. The one or more monitoring and injection devices can be connected to one another in a mesh network, and wherein the one or more monitoring and injection devices obtain periodic configuration and synchronization data from one or more of the monitoring and injection server and another monitoring and injection device.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a block diagram of a mobile device which may be used for the monitoring and injection device of FIG. 1A, the client in the WLAN network of FIG. 1C, or the like.

DETAILED DESCRIPTION OF THE DISCLOSURE

Again, in various exemplary embodiments, the present disclosure relates to wireless raw packet sensing and injection systems and methods for targeted communications, namely to enable and augment new communication channels. In an exemplary embodiment, a monitoring device is configured to monitor frames on a network, cache relevant frames, and detect opportunities to inject raw frames as appropriate. The monitoring device can include a data store, a detection module to detect injection opportunities, a raw packet injection device to inject wireless data, and the monitoring device can be connected to an external server for data aggregation, coordination of multiple systems, and remote control. In an exemplary embodiment, one or more monitoring systems can be deployed in proximity to wireless hotspots or the like, such as at conventions, trade shows, airports, public transportation, libraries, concerts and other events, coffee houses, and the like.

The monitoring device enables direct communication with neighboring systems of like kind, using sensing and injection capabilities, with or without encryption enabled. Another configuration of the monitoring device is direct communication with other standards-based devices, when the opportunity presented itself. One example of such opportunity could be to send an arbitrary message to a Web browser on a standards-based device when that Web browser is anticipating a reply to a previously sent request which had been monitored by the monitoring device. The message could be a relevant, targeted advertisement intended to reach users in a certain geography. Geography may be administratively determined or via modern locationing technology present on the device.

Advantageously, the monitoring device and system not only knows when it is possible to inject the communication from a technical basis but also based on a user-behavior basis. Knowing when to perform a packet injection on a user-behavior basis requires aggregation of data from one or more injection devices, along with an analysis of other factors including identifying information, past traffic, past injection attempts, and interactions, or potentially other data correlated with the user such as cookies, probe requested WLANs, etc. The compilation and near-real-time analysis of this data in and of itself can offer value to advertisers, but its integration with the raw sensing and injection system is key to the effective placement of advertisements.

Wireless Raw Packet Injection

IEEE 802.11 is a set of MAC and physical layer (PHY) specifications for implementing WLAN computer communication in the 900 MHz and 2.4, 3.6, 5, and 60 GHz frequency bands. As described herein, IEEE 802.11 relates to the various standards and variants thereon. Of note, the wireless spectrum in the 2.4 GHz and 5 GHz bands is unlicensed, meaning operation in this range is unregulated and manufacturers and operators are free to provide products and operate in this range. The use of unlicensed spectrum has provided significant innovation and use of Wi-Fi technology. As such, the wireless raw packet injection described herein is through this unlicensed spectrum.

At a basic level, one example of wireless raw packet injection is a basic echo request, or "ping" between WLAN stations. Normally, in an infrastructure environment, an intra-network echo request is sent from the transmitting station to the receiving station on the network by way of the WLAN access point. In many infrastructure WLANs, this basic station-to-station communication is disabled. However, in networks where there is no encryption, or where the encryption keys are known, it is possible to craft and send (inject) a packet using raw packet injection where the "from DS" (DS=Distribution System) flag is set, as well as the destination MAC address of the receiving station is set, and BSSID of the access point is set, and the source MAC address of the sender is set, where the packet appears to originate from the WLAN distribution system, when in fact it originated directly from a raw injection device. This represents the first half of the communication. The second half depends upon raw packet sensing.

When the wireless interface on the device receives the echo request and successfully processes it according to standards and beings to send a reply, normal IEEE 802.11 infrastructure standards dictate that this packet be sent to the WLAN distribution system, or via the associated access point, which in this scenario would not permit the packet to traverse the infrastructure environment to another station due to policy. However, because the WLAN medium is shared, when the ping echo reply packet is sent from the station to the access point, the packet injecting device which sent the request in the first place, can monitor for this transmission, and consequently process a reply, as if the packet had successfully traversed the standards-based infrastructure.

While an echo request and reply communication is used in this example, applying this same logic to HTTP communication, in particular when a Web browser is awaiting a reply, would allow for the transmission of direct advertising messages on this shared medium so that WLAN users are made aware of relevant products or services. Today, only advertisements originating from within the WLAN infrastructure network, or from the end-user to server HTTP communication stream are received by the end user. Today, vendors wishing to make use of mobile device end-user proximity to provide relevant advertisements on a digital medium face an impractical challenge to ensure that their advertisement is seen only by those in immediate proximity to the location where they wish to spread awareness of their products, services, or brand. Specifically, these conventional approaches for advertisements are not proximity-based, but rather network-based.

Additionally, in general, where other beneficial communication, particularly in the unlicensed spectrum is desired using mass-market wireless network interfaces, that have been prepared to operate according to standards, there is no easy system in place enabling other communications outside of the standards to occur. There exists proof-of-concept software such as "Airpwn," "Airpwn-ng," "Airtun-ng," and "Wifitap," originally purposed for the network security and penetration testing community, where the method of packet injection on a wireless medium can be tested in some circumstances. However, the commercially viable application of such software is limited to compatibility with hardware, and these underlying methods have not been purposed toward proximity advertising or mesh communication, which require more complex systems described herein to accomplish. Utilizing the existing open source tools without serious modification, or in absence of an overarching systems and methods would not accomplish the ends either of a proximity advertising system, or other purposed communication where a standards-based device is the recipient or a proprietary communication system between these injection and sensing devices. Additionally, only operating on a single channel, or in some cases with a single access point makes these tools impractical for purposed use.

Raw Packet Monitoring and Injection Device and System

Figure 1A:
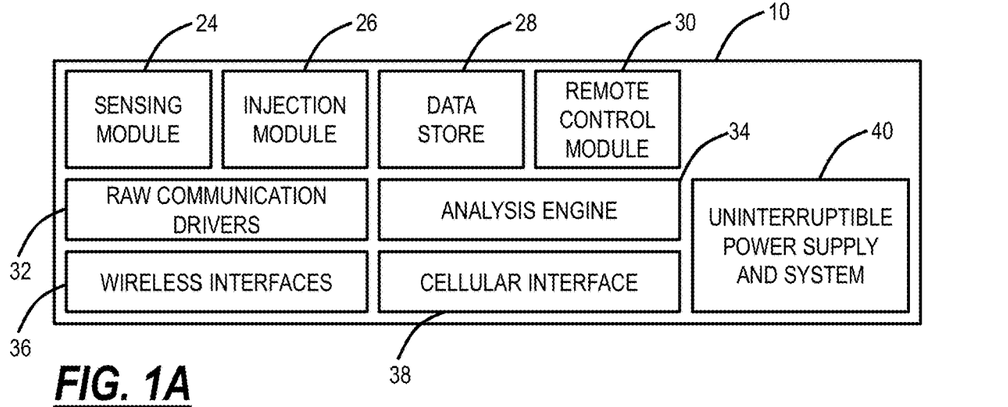
FIGS. 1A, 1B, and 1C are block diagrams of a monitoring and injection device (FIG. 1A), a monitoring and injection server (FIG. 1B), and a WLAN network (FIG. 1C)
Figure 1B:
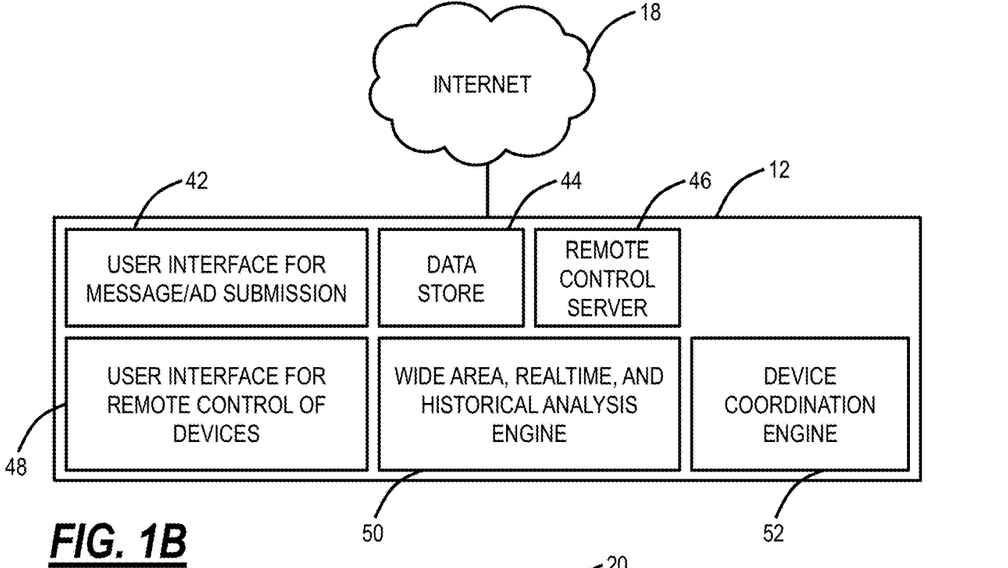
Figure 1C:
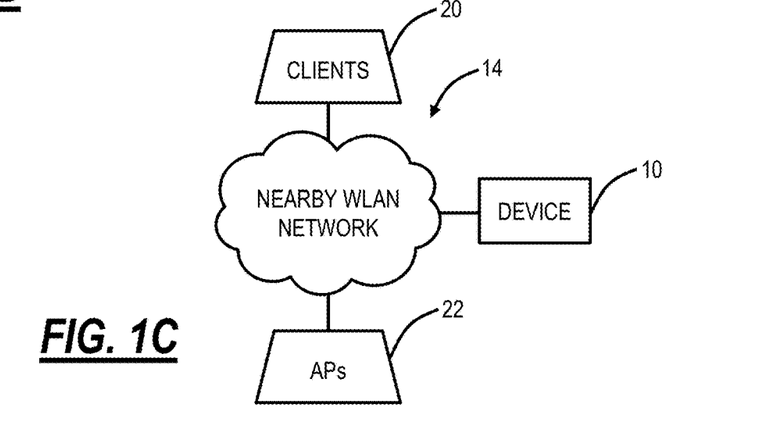
Figure 5:
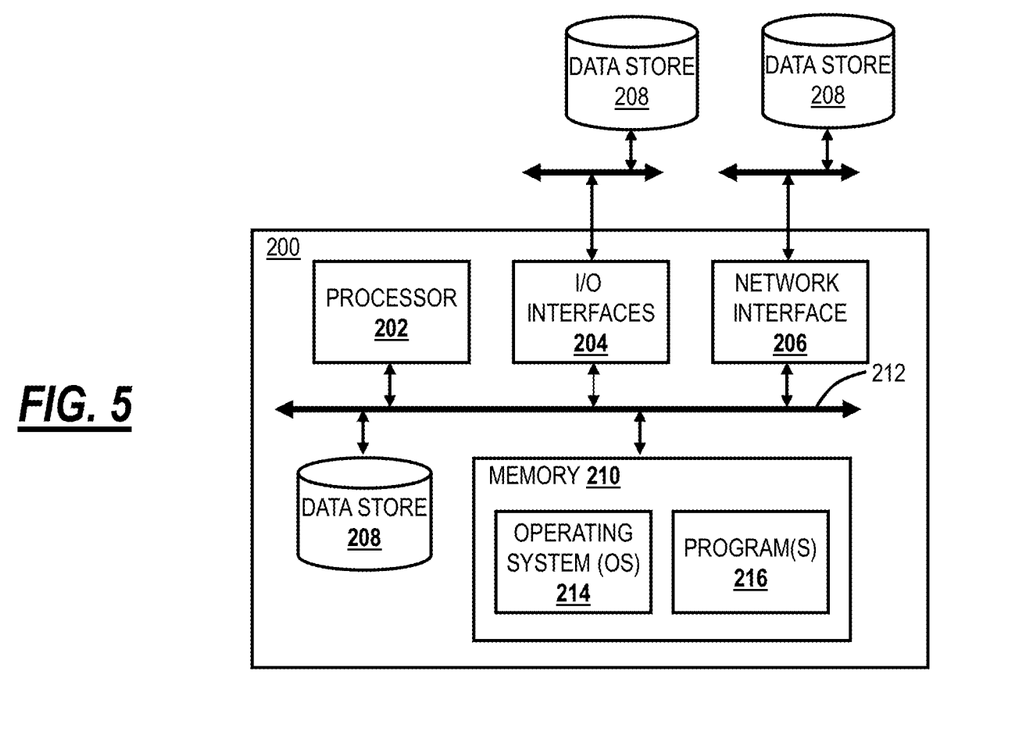
FIG. 5 is a block diagram of a server which may be used for the monitoring and injection server of FIG. 1B.
Figure 6:
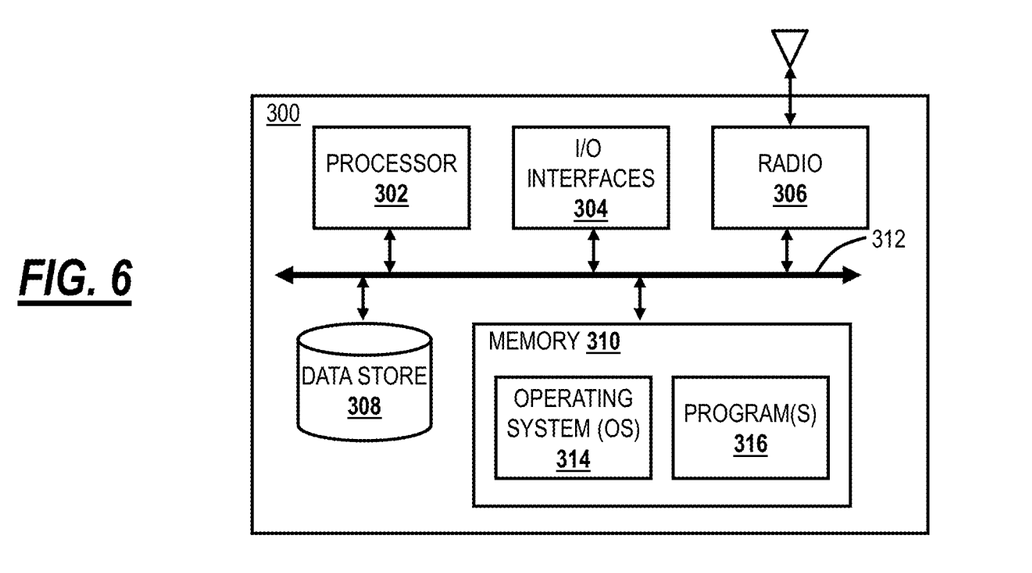

Referring to FIGS. 1A, 1B, and 1C, in an exemplary embodiment, block diagrams illustrate a monitoring and injection device 10, a monitoring and injection server 12, and a WLAN network 14. In particular, the monitoring and injection device 10 is in proximity to the WLAN network 14 and the monitoring and injection server 12 communicates to the monitoring and injection device 10 over the Internet 18. The monitoring and injection device 10 is a raw communication device in wireless proximity of the WLAN network 14 where there are connected clients 20 and access points 22. The monitoring and injection server 12 can be in another location, i.e., not proximate to the WLAN network 14, but connected to the Internet 14 such as via a cellular link, a wireless link (e.g., over the WLAN network 14), a wired link, etc. The monitoring and injection device 10 can be realized similar to a mobile device 300 as illustrated in FIG. 6 and the monitoring and injection server 12 can be realized similar to a server 200 as illustrated in FIG. 5.

FIG. 1A illustrates functional components of the monitoring and injection device 10 which include, for example, a sensing module 24, an injection module 26, a data store 28, a remote control module 30, raw communication drivers 32, an analysis engine 34, wireless interfaces 36, a cellular interface 38, and an uninterruptible power supply and system 40. These components 24-40 can be hardware, software, firmware, and/or combinations thereof such as in the mobile device 300. The sensing module 24 is configured to monitor traffic on a wireless network such as the WLAN network 14, the injection module 26 is configured to inject traffic on the wireless network. The raw communication drivers 32 are configured to provide the appropriate linkages between the modules 24, 26 and the interfaces 36, 38.

The data store 28 provides storage for packet data, configuration data, and algorithms required for purposeful injection. The analysis engine 34 is key to the appropriate timing and reasoning behind the sensing and injection events. The uninterruptible power supply and system 40 provides power to the monitoring and injection device 10 and may continue in the event of an external power failure. A battery is a key component of the uninterruptible power supply and system 40. The core functionality may continue with the presence of other power sources that are interruptible, or internal batteries, etc. In an exemplary embodiment, the monitoring and injection device 10 can be portable, such as in a backpack.

The cellular interface 38 enables out-of-band communication with the monitoring and injection server 12 but does not serve as the only possible path for this communication to occur, since the wireless interfaces 36 could be purposed for this as well. The wireless interfaces 36 could also be purposed to connect in an ad-hoc manner to nearby monitoring and injection devices 10 as well. The remote control module 30 enables the monitoring and injection server 12 to control and provision the monitoring and injection device 10.

FIG. 1B illustrates functional components of the monitoring and injection server 12 which include, for example, a user interface 42 for message/ad submission, a data store 44, a remote control server 46, a user interface 48 for remote control of the devices 10, a wide area real-time and historical analysis engine 50, and a device coordination engine 52.

These components 42-52 can be hardware, software, firmware, and/or combinations thereof such as in the server 200. The user interfaces 42, 48 can be graphical user interfaces or the like for users to interface with the monitoring and injection server 12 either locally or over the Internet 18. The user interfaces 42, 48 can be integrated in a single user interface and are shown separately for illustration purposes. The user interface 42 enables control for business-related purposes such as the location and design of various advertising campaigns, images, links, etc. The user interface 48 enables administrative control and access to each device 10 that has connected to it remotely.

The monitoring and injection server 12 generally provides command and control of one or more of the monitoring and injection devices 10. The monitoring and injection server 12 can also provide coordination of monitoring and injection devices 10 in close proximity to one another where it may be beneficial to know which end user devices have already experienced an injection event from one monitoring and injection device 10 in the vicinity.

The data store 44 is shown as part of the monitoring and injection server 12 and can be used to store ad or message data, historical injection operations, etc. The data store 44 can also be located all or in part external to the monitoring and injection server 12 such as a current database where access level to these parameters may be determined or governed. The continual synchronization of sensing and injection data from remotely deployed devices 10 into the data store are periodically accessed by the analysis engine 50 and the device coordination engine 52. The coordination engine 52 is responsible for coordinating activity between multiple devices 10. The analysis engine 50 is further described herein and provides intelligent injection opportunities.

In FIG. 1C, the combination of one or more of the monitoring and injection devices 10 and the monitoring and injection server 12 forms a raw sensing and injecting communication system. In operation, the one or more of the monitoring and injection devices 10 are deployed in proximity to the WLAN network 14 (or other WLAN networks). In proximity means the one or more of the monitoring and injection devices 10 are within the range of one or more access points 22 forming the WLAN network 14. Note, while described herein with reference to IEEE 802.11, the monitoring and injection devices 10 and the monitoring and injection server 12 contemplate operation with other wireless protocols, e.g., non-IEEE 802.11/WLAN). For example, other exemplary embodiments can include software radios with the monitoring/injecting configured for arbitrary communications and mesh capabilities.

Raw Packet Monitoring and Injection Process

Figure 2:
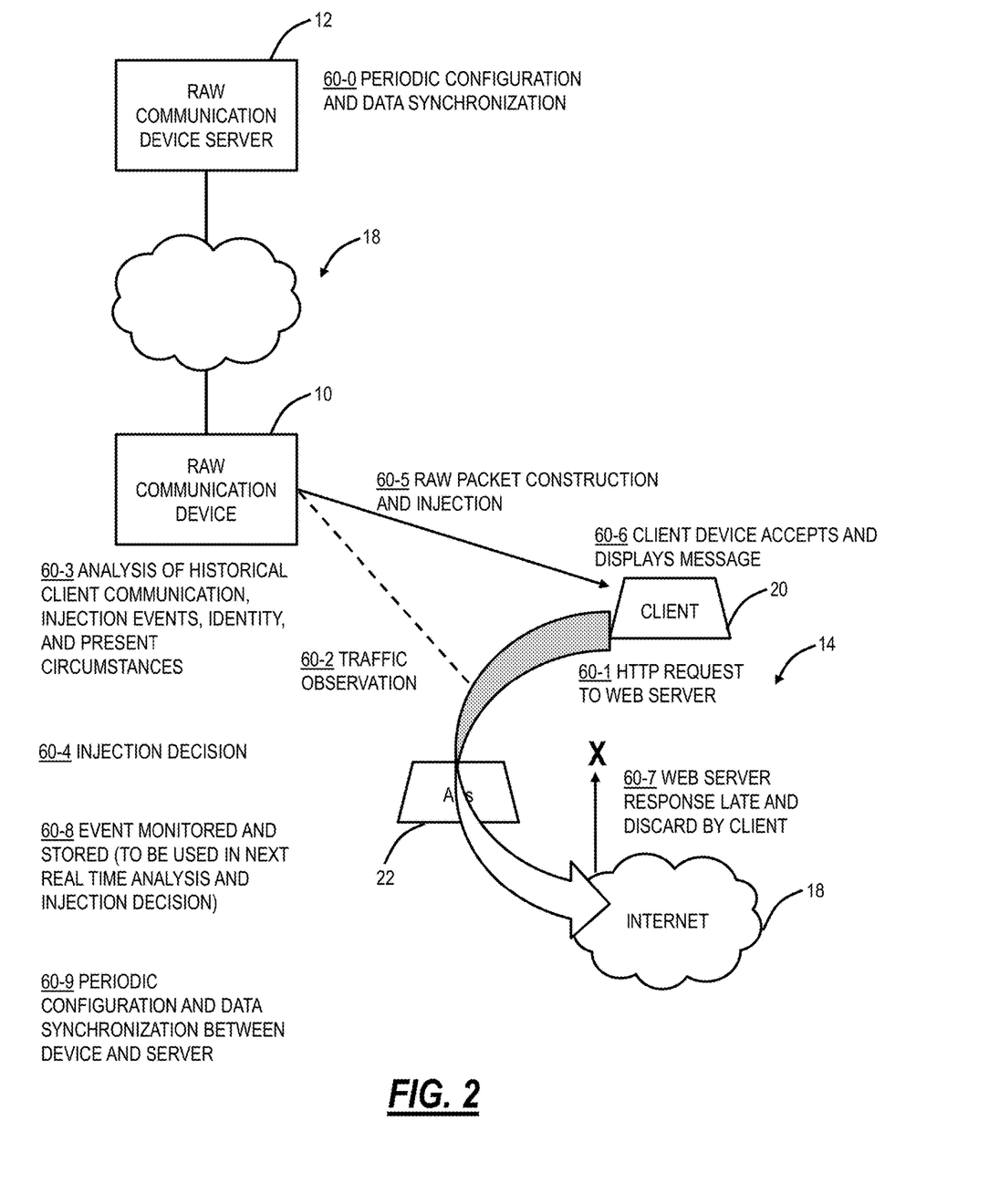
FIG. 2 is a flow diagram of a raw packet monitoring and injection process using the device of FIG. 1A, the server of FIG. 1B, and the WLAN network of FIG. 1C.

Referring to FIG. 2, in an exemplary embodiment, a flow diagram illustrates a raw packet monitoring and injection process 60 using the device 10, the server 12, and the WLAN network 14. The process 60 illustrates the sequence of events in an exemplary operation for generating a message or advertisement and injecting the message to the client 20 over the WLAN network 14 using the HTTP protocol as an example. In FIG. 2, the monitoring and injection device 10 is noted as a raw communication device and the monitoring and injection server 12 is noted as a raw communication server.

Prior to any client action, relevant data from the raw communication server is synchronized with the raw communication device (step 60-0). This synchronization may include statistics or other data about the client 20 that is about to experience an injection event as well as content for the injection event. This periodic configuration data synchronization can occur continuously to update the device 10 with content and statistics from the server 12. In an exemplary embodiment, the device 10 itself is configured to locally determine injection events. In another exemplary embodiment, the device 10 and the server 12 can collectively determine injection events. In either case, the periodic configuration data synchronization is performed to advance the injection events and can be performed prior to monitoring and injection.

In operation, a client 20 initiates a request to a Web server (step 60-1). Again, in this example in FIG. 2, the protocol is HTTP, but those skilled in the art will recognize other protocols are also contemplated. This traffic is sensed/observed by the raw communication device 10 in wireless proximity to the client 20 device (step 60-2). That is, due to the proximity of the device 10 to the client 20, the device 10 can sense/observe the request to the Web server. Subsequent to detecting the request (step 60-2), an analysis of historical client communication, injection events, identity of the client 20, and present circumstances (step 60-3) and an injection decision based thereon (step 60-4) occurs. Steps 60-3, 60-4 occur quickly such as within milliseconds. This quick timing is while the client 20 is waiting for a response from the request to the Web server.

Assuming a positive injection determination occurred (step 60-4), raw packet construction and injection occurs (step 60-5). Here, the device 10 basically constructs a response to the request to the Web server. Again, as described herein, this response is not from the Web server, but rather from the device 10 which is using the request as an opportunity to provide targeted communication. That is, the raw packet constructed and injected is an HTTP response with a message based on the determined targeted communication.

The client 20 accepts and displays this message from the raw, injected packet (step 60-6), as it processes it as if it were the response packet it were expecting from the Web server contacted in step 60-1, provided the injected packet arrived prior to the response from the aforementioned server. When the Web server response finally arrives, the packet is discarded (step 60-7). Specifically, the Web server response is late. However, the decisions made in steps 60-3, 60-4 enable a seamless experience for the user as the injected packet can dynamically include information about the original request so that the system can include in its message another message to the client 20 to resume its original communication.

In the case of an effective advertisement, being sensitive to the end user experience is critical for this system to have value. The set of events is monitored and stored in the raw communication device for future synchronization as well as utilized in future real-time injection decisions (step 60-8). For example, if the same client 20, a minute later were to receive another advertisement, or even the same advertisement this would be a negative experience for the end user, which is why cataloging this data for future analysis is critical. Subsequent to the operation, the periodic configuration and data synchronization between device and server can be performed again (step 60-9), ultimately so that injection decision quality continues to improve over time.

Monitoring and Injection Devices

The monitoring and injection devices 10 are configured to sense and inject information into a normal data stream between the clients 20 and the access points 22, such as using Transmission Control Protocol (TCP), JavaScript, DNS, HTTP, etc. Again, the information can be for displaying information to users in proximity to the monitoring and injection devices 10, i.e., advertisements, notifications, updates, other relevant information based on proximity, etc. Thus, the monitoring and injection device 10 monitors a network communication stream associated with a client 20 and can inject information therein. The injection of an arbitrary data packet into the network communication stream enables modification of the data sent to the end user or to the server, and there can be many beneficial purposes for this modification such as for targeted communications.

The monitoring and injection device 10 further acts as a sensor to determine information about the identity of the clients 20 in proximity or the users using those devices. In IEEE 802.11, this is typically accomplished by placing the wireless interfaces 36 into a "monitor mode." This sensed information could be information obtained because the WLAN network 14 is unencrypted, and thus information traverses freely, or in the case that the encryption key is known and the information is thereby decrypted, or in the case where the decryption key is not known, but analytics of encrypted data make it possible to derive identity information about the proximity client 20 or user. The information obtained is provided to the analysis engine 34, the analysis engine 50, and/or the device coordination engine 52.

The monitoring and injection device 10 can use packet injection methods that are similar to those developed by open source software developers of the tool "Airpwn." One of the purposes of this monitoring and injection device 10 is to inject advertising information, relevant or otherwise to the communication stream. Competing technologies that deliver advertisements on a proximity basis, such as Bluetooth beacons, require additional software and possibly opt-in agreements with the end user. The approach with the monitoring and injection device 10 enables end users to receive messages or advertisements without an application installed on their mobile device. For example, most end users already have a Web browser installed on their client 20, and this sensing and injection capability enables communication directly with an active Web browser in many scenarios.

Again, the monitoring and injection device 10 works without a dedicated application on the client 20 or an affirmative opt-in by the client 20. In an exemplary use case, the monitoring and injection device 10 is deployed in a public Wi-Fi hotspot where the user is temporarily connected. Here, the targeted communication can be relevant to the location of the public Wi-Fi hotspot and thus not too inconvenient for the client 20. Since the access here is typically no cost, the insertion of the targeted communication has minimal distraction while potentially providing valuable information to the client 20. For example, the client 20 could be at a trade show and the targeted communication can be an invitation to visit a specific booth. Of course, various other embodiments are contemplated.

In an exemplary embodiment, advertisers may wish to use the monitoring and injection device 10 to augment traditional print media campaigns (posters, flyers, etc.). It is also possible to use the location data associated with the monitoring and injection device 10 to target specific ads to specific clients 20. Other data that is collected by the monitoring and injection device 10 could also be used for advertisement and marketing targeting, such as based on the MAC address, browsing history, IP traffic history, and other profile data. In cases where the client 20 MAC address is randomized by the underlying software, as is currently the case for devices using Apple's mobile operating system, iOS9, there are algorithms in place to nullify randomization effects and maintain a persistent identity. These algorithms may be obtained directly from the manufacturer or derived.

Other identifying information such as cookies, set or retrieved by the device 10 or observed by the device 10 in other transactions may also be used in determining identity. The device 10 will have the capability to determine if traffic is intended to enable the client 20 to log into a captive portal so that they are able to do so and thus gain access to the Internet 18 at the specific location they are at, via the WLAN 14. One way this can be accomplished is by analyzing the destination IP addresses of the traffic to see if the destination address is within a private address range and to forego injection if that is the case. That is, the device 10 would avoid injection attempts when the client 20 is initially connecting to the access points 22.

Existing test packets used by mobile devices and/or computers today could be injected to determine if there is additional sign-in information needed. If a response is detected then it is likely that the client 20 in question has been authenticated. For example, an Android operating system phone may send a request out to Google.com/blank.html and if a response other than that which is expected is returned then that is evidence that there is not a direct connection to the Internet 18, and that there is a captive portal or walled garden in place requiring further end user action, such as registration or submitting to terms or agreements to use the Internet connection. It is important to determine this because it is important to not disrupt the user's Web browsing experience, or block their access unnecessarily by injecting traffic during this phase in the user experience, though in some instances an overlay ad may be deemed appropriate to present during this phase, such as in conjunction with a captive portal page. The analysis engine 34 is configured to make this determination in near real time. The sensing module 24 and the injection module 26 become useful when combined with the analysis engine 34 configured to know when and what traffic to inject for a given purpose, e.g., commercial.

Collectively, information obtained by the monitoring and injection device 10 can be referred to as identifying information. This identifying information can be stored in the data store 28 and used by the analysis engine 34. Further, the identifying information can be provided to the monitoring and injection server 12. In an exemplary embodiment, the analysis engine 34 maintains a current database of monitored clients 20 based on the identifying information. The current database can further include a history of injection events and the analysis engine 34 can make injection determinations based on this data in the current database.

The sensing module 24 can be utilized to map relationships between MAC address or other user or client 20 based identification with the WLAN networks 14 that the mobile devices are probing for. This can also help to determine the primary origin of the client 20 based on information about geography and networks at physical locations. This type of information may be used for analytics or other purposes.

The monitoring and injection device 10 is deployed in proximity to wireless networks and clients 20 so that its wireless interfaces 36 can sense and inject to the clients 20. The monitoring and injection device 10 can be realized in the form of a laptop, appliance, or other computing device. The monitoring and injection device 10 can also be realized as a handheld device such as using compact hardware such as Raspberry Pi. Other Intel-based or ARM-based platforms are also contemplated. It is also possible that a mobile phone may be used as the basis for the monitoring and injection device 10, enabling wide distribution. Granted, in this case, certain driver-level modifications, typically at the root privilege level, must be made in order for the device 10 to be placed in monitor mode. The monitoring and injection device 10 could also be a wireless router or antenna intended for Wireless Internet Service Provider (WISP) deployments. The monitoring and injection device 10 may have external antennas to maximize the range of sensing and injection on the wireless medium. External antennas may also aid in beamforming technologies that direct traffic toward a specific client's 20 direction.

In an exemplary embodiment, when the monitoring and injection device 10 is realized in a mobile device or tablet, the monitoring and injection device 10 functionality can be realized in that form factor via an application that is distributed via an application store. The application or "app" can enable performance of the various functions described herein as well as support configuring the wireless interfaces 36 for root access to support the monitor mode. The mobile device or tablet can communicate to a cloud server forming the monitoring and injection server 12. In this manner, the distribution and realization of the monitoring and injection devices 10 is efficient and the functionality can be provided via a cloud service.

The power supply and system 40 may include an external power source, which could be a USB power supply, dry or wet cell battery, AC/DC adapter, or internal battery. There may be an additional mechanism, such as a powered Ethernet hub, attached to the same power source, to aid in the monitoring of when external power is lost. The monitoring and injection device 10 could run a version of Linux software as its underlying operating system (for example, Android, OSX, or other Linux variants), with appropriate drivers installed to enable raw packet monitoring and raw packet injection on the wireless interface(s) 36 attached. The wireless interfaces 36 may be external via Universal Serial Bus (USB) connections, or internal connections to a motherboard of the device 10. In mobile phone or tablet environments, IEEE 802.11 wireless interfaces can be integrated with other functions on application specific integrated circuits (ASICs).

In an exemplary embodiment, the monitoring and injection device 10 is portable and installed on-demand without having to register with the WLAN network 14 operator. This operation is convenient and useful for use cases that are transitory such as trade shows, conventions, sporting events, etc. The monitoring and injection device 10 is brought in and used during a duration of an event. Advantageously, the monitoring and injection device 10 does not require network configuration or onboarding to work with the WLAN network 14, making deployment efficient. In another exemplary embodiment, the monitoring and injection device 10 is located for a period of time at a location. This operation is useful for other use cases such as libraries, airports, coffee houses, transportation centers, etc. It is expected that the monitoring and injection device 10 operates with or without the knowledge of the WLAN network 14 operator.

If the monitoring and injection device 10 is a mobile phone, tablet or mobile laptop, there may be an option presented to the user for how active the sensing and injection capabilities are, in terms of battery life or other performance metrics. The monitoring and injection device 10 could potentially be a wearable electronic device or other household or general device with appropriate circuitry, memory modules, central processing units(s), wireless technology. These devices can self-form mesh networks when necessary with other enabled devices 10, such as in FIG. 3. It may be necessary to have certain components of root access obtained through the mechanisms or software on the device to enable sensing or injection capability on the mobile device. Mesh networks of these devices 10 may enable the routing of communication from one part of the network to another.

As described herein, the monitoring and injection device 10 as an injector and sensor possesses the innate ability to directly communicate with other wireless devices (the clients 20) without the need for communication to be directed through a base station or access point 22. This can be useful when endpoint to endpoint communication is not permitted by the operators of the related WLAN network 14. Because the monitoring and injection devices 10 do not require integration with existing IT architecture, they possess a deployment advantage over other technologies. While this may appear to violate traditional or agreed upon communication protocols, the positive benefits when applied correctly outweigh this diversion from the standards.

TCP Packet Injection

Successful packet injection onto a wireless medium, where TCP packets are concerned, often requires calculating the appropriate TCP sequence number of the next packet, in addition to arriving at the client 20 prior to a response from the original server in the communication. This sequence number calculation may be derived from previous packet communication occurring just prior to the injection event between two wireless devices, for example, an access point 22 and a client 20. In the case of TCP, this has to do with the sequence numbers and lengths of packets. To accomplish the purposes of sending an arbitrary message to an end user, it may be necessary to insert an HTTP redirect message, a JavaScript tag, or to directly insert a Hypertext Markup Language (HTML) document or image into the receiving stream. There may be other methods as well. The code sent to the client 20 may direct the browser or application to load predetermined code (with or without a dynamic component derived from traffic or user behavior) that enables further messages to display, and then call for the originally intended code to be downloaded, in essence, appending or prepending the injected code with the original code.

The recipient often will already have an open communication with a Web server or is in the process of establishing one, however, because the wireless packet from the devices 10 is injected prior to the response from the Web server, the end user Web browser or application will usually process the first packet received. A TCP FIN (finish) message could be sent to prevent unnecessary request and reply traffic from occurring on the medium. Additionally, sending, through injection, multiple copies of the same frame may mitigate collisions with other packets on the medium. A retransmit flag on the IEEE 802.11 medium could be set in this instance. Non-TCP traffic such as Domain Name System (DNS) can also be injected.

Another type of injection can be the injection of captive portal test packets. For example, when a new device connects to a wireless network, it will often, in the background, send out a test packet to a known server (one example of this is captive.apple.com/hotspot-detect.html), but every operating system differs so different attempts can be cataloged. If the monitoring and injection device 10 inject a different message or a redirect when these requests go out, then the client 2—will think it is inside of a walled garden or captive portal, and this often prompts the user to log in to a splash screen (in this case, a splash screen associated with the monitoring and injection devices 10) to the Web. The advantage of this approach is that the reach extends to all devices 10 in proximity, even those that would have originally only visited Web pages that have HTTPS encryption, because these initial captive portal checks are unencrypted.

Injection Determination

The analysis engine 34 in conjunction with processing from the analysis engine 50 is configured to perform injection determinations based on the sensing module 24.

In another exemplary embodiment, the conjunction between the analysis engine 32 and the analysis engine 50 is on a non-real-time basis, to make the initial injection in a matter of milliseconds, and any connection currently between the analysis engines 32, 50 would probably be greater than 10 milliseconds. Here, the initial injection decision by the analysis engine 32 could be based on a loose "conjunction" with analysis engine 50. Outside of the "initial" decision to inject a redirect, the analysis engine 50 can still be used to govern what, if anything should be included in the response to the followed redirect, once the user has been directed to it. From a definitions standpoint, does a "second half" of the injection, which typically contains the ad content, count as part of the injection or should we just refer to the initial redirect as an injection. Also, the ad content can be synced or static on the proximity equipment (the devices 10) to bypass any ad blockers or firewalls etc., and potentially increase performance for users.

The injection determination is a key aspect and understanding when to inject a packet may be governed by several constraints. One is time limit since last successful injection (or otherwise), and also the number of successful clicks or actions take subsequent to an injection, or other end user interaction. That is, the analysis engine 34 can use the current database and note each injection event and then track subsequent activity and/or time to determine a next injection event.

Additionally, the injection determination may be governed by the historical possible links that have been observed and subsequently reconstituted from traffic monitored. For example, if a user is browsing the Web and arrives at a Web site that has 10 different possible links to other Websites or other browser actions and interactions, this information can be cached (in the data store 28 and/or the analysis engine 34) so that subsequent fast injection is possible, when and if a user follows one of those links. Because a Web browser typically sends out several HTTP GET requests to load various elements on a Web page, understanding which GET request to reply to, through the analysis engine 34 can minimize undesired consequences of injection negatively affecting the core function of the Web page that the end user intended to load. For example, the injection can include substituting a GET request for one part of a Web page making the targeted communication in-line to avoid negative user experience.

The injection determination is performed locally at the monitoring and injection device 10 using local algorithms in proximity to the end user, or by external means through tracking techniques embedded in the message sent to the end user.

Analyzed data, such as data generated as a result of the packet injection events, or general passive data may also be useful for improving the functionality and also the effectiveness of messages sent in particular if these messages are advertising in nature. Aggregating data across multiple instances of devices 10 can help to construct a greater view of reality. External data sources, public or private may also aid in improving the functionality of the device 10. Advertisements may be obtained dynamically from ad exchanges, marketers, agencies or other entities.

Injection Server

The injection and subsequent processes may be augmented through the use of an external server to carry out the message serving. Alternatively, the monitoring and injection device 10 may become a virtual web server. It may also potentially be used as a virtual proxy server, where connections are maintained via packet manipulation or otherwise to the client 20 as well as the external server that it originally intended to connect with. For example, if the client 20 intended to connect to a news site, one mechanism for serving an interstitial ad would be to assume the connection between the client 20 and the news site, sending modified packets from the server to the client 20, using packet sequence number calculation techniques or otherwise. The term interstitial ad can be its own page in a natural sequence of pages, a rather large as on top of a page (like a pop-up without having a different browser window popping up), or the like.

HTTP streams are of particular usefulness, but with any stream, proper encoding and decoding, compressing and uncompressing of packets to assemble and disassemble streams is something that could be implemented on the monitoring and injection device 10.

Multiple Monitoring and Injection Devices

Figure 3:
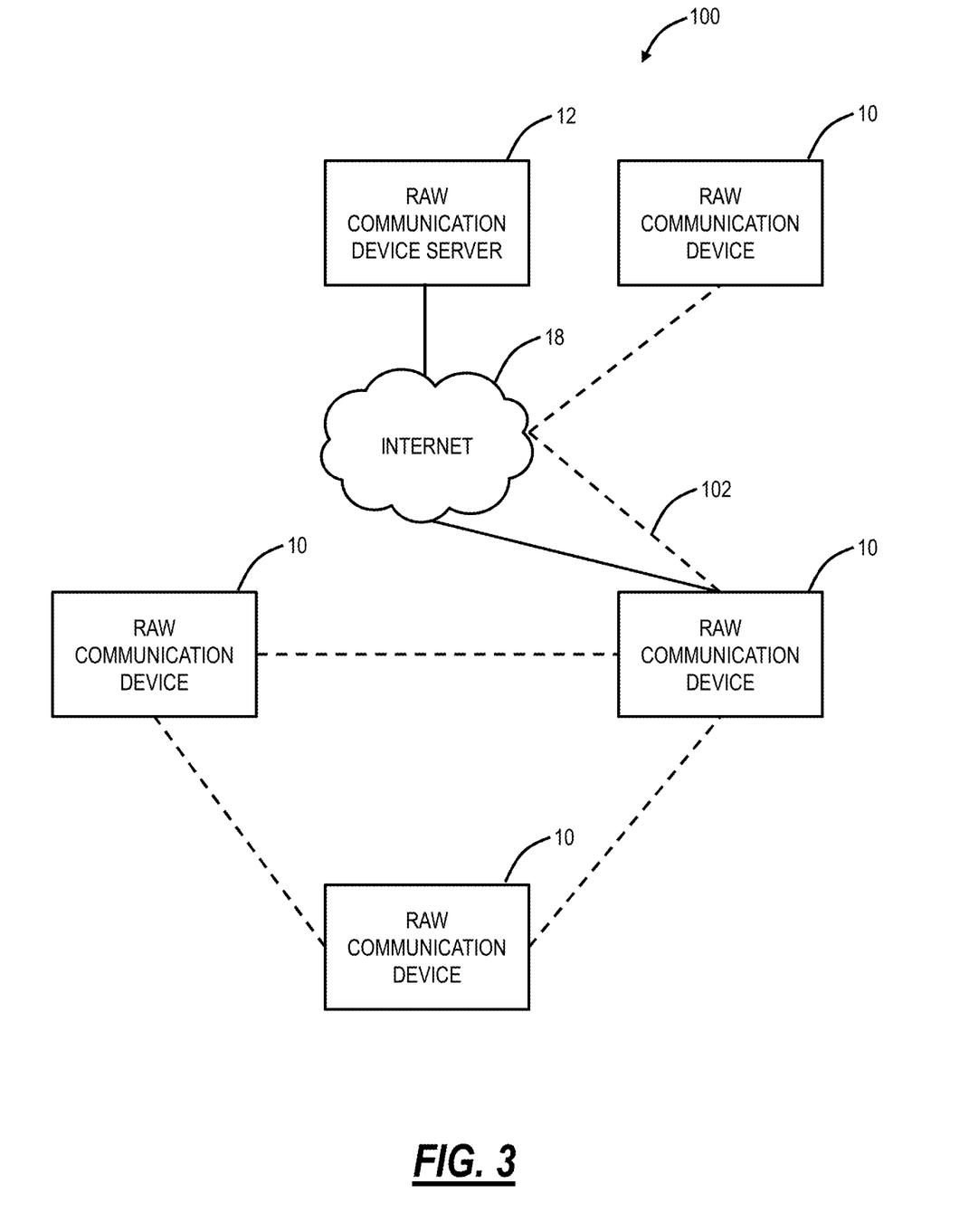
FIG. 3 is a network diagram of a network with a plurality of monitoring and injection devices coordinated together at a location.

Referring to FIG. 3, in an exemplary embodiment, a network diagram illustrates a network 100 with a plurality of monitoring and injection devices 10 coordinated together at a location. The monitoring and injection devices 10 can be configured to form a mesh network with one another at the location (connections denoted by dashed lines 102 in FIG. 3). Communication back to the monitoring and injection server 12, or to other servers may be relayed from one device 10 to another, and redundant links may be formed. The network 100 may also self-heal when a connection is broken. It may also be possible to connect the mesh virtually across a wide area.

Where there are multiple monitoring and injection devices 10 in proximity, coordinating efforts may be beneficial. The monitoring and injection server 12 can assist in the coordination via the device coordination engine 52. For example, understanding that one monitoring and injection device 10 already performed a successful injection to a client 20 would be valuable information for another monitoring and injection device 10 to be aware so that it does not overwhelm the end user unnecessarily. Retaining similar information in an external/cloud database could enable coordination over a wide area, such as through the device coordination engine 52.

Examples of Targeted Communications

Figure 4:
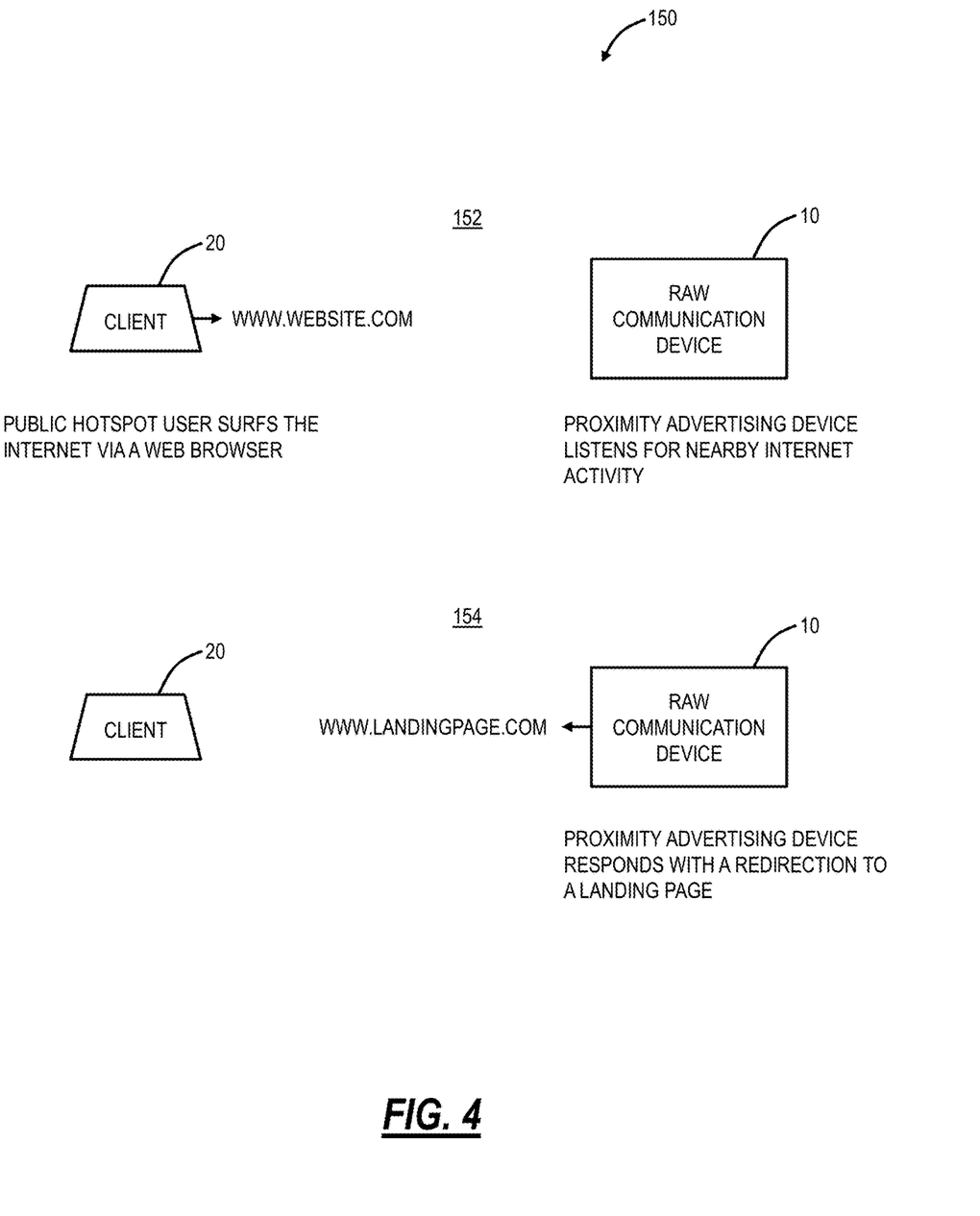
FIG. 4 is a network diagram of a network with a client and a monitoring and injection device performing an exemplary operation.

Referring to FIG. 4, in an exemplary embodiment, a network diagram illustrates a network 150 with a client and a monitoring and injection device 10 performing an exemplary operation. At a point 152, the client 20 is connected to a wireless network (not shown) such as a public hotspot and the monitoring and injection device 10 is deployed in proximity (again, proximity means the monitoring and injection device 10 can sense and inject wireless data to/from the client 20). This example assumes IEEE 802.11 and HTTP protocols. At the point 152, the client 20 is surfing the Internet via a Web browser locally executed and the client makes a request to a Web server (e.g., for www.website.com). The monitoring and injection device 10 in proximity to the client 20 listens and senses this request. At a point 154, the monitoring and injection device 10 has determined that an injection event is warranted (see FIG. 3) and responds to the request (e.g., for www.website.com) with a redirect to a landing page (e.g., www.landingpage.com). The landing page contains the targeted communication and is served to the client 20 before the Web server responds with www-.website.com.

The monitoring and injection server 12 could also contain a user-friendly front-end, i.e., the user interface 42. For example, an advertising company wishing to upload advertising content or direct to a separate landing page may wish to do so periodically by interfacing with an external website, which can then make the appropriate changes to the devices 10 in the appropriate location. A bidding or other allocation algorithm and technology may be implemented to enable multiple parties to timeshare the resource.

Those skilled in the art will recognize there are various uses for the targeted communications. In a first use case, the targeted communications can be associated with a trade show or convention. Here, the monitoring and injection devices 10 are deployed in proximity to the trade show floor or the like. The targeted communications can be invitations to booths (e.g., visit Acme Corp. at booth 637), scheduling updates, or other notifications. It is expected the monitoring and injection devices 10 could be used by the organizer to update attendees with valuable and pertinent information. Again, the benefits are simplicity of deployment, ease of integration with existing IT resources, etc. The organizer would not need to coordinate with on-site IT personnel to deploy the monitoring and injection devices 10. Of course, the monitoring and injection device 10 could be deployed by attendees to generate booth traffic, buzz, etc.

Another use case could be a transportation hub such as an airport. Here, the monitoring and injection device 10 could be used to provide targeted communications related to scheduling, boarding, etc. For example, if the monitoring and injection device 10 was deployed at a gate at an airport, the targeted communications could be boarding updates, first class upgrade notifications, and the like.

The benefit of the monitoring and injection device 10 is targeted communication since the location is directly known—the monitoring and injection device 10 is deployed in proximity to the client 20. This can be referred to as hyper-local advertising. Further, there is no opt-in or application download required on behalf of the client 20.

Local Versus External Flexibility

To overcome integration challenges such as perimeter mechanisms (firewalls, proxies, etc.) that may be in place, one advantage of having the monitoring and injection device 10 local is that it can provide direct services to the client 20. If there are ad blockers installed on the client 20 that block certain Websites, this content could potentially be served directly from the monitoring and injection device 10. If certain sites or connections are blocked by network perimeter technologies, a local transmission using injection and sensing may also be used. Thus, having the monitoring and injection device 10 locally serving the clients 20 based on the sensing module 24 and the injection module 26 overcomes any perimeter mechanisms or ad blockers. The perimeter mechanisms are avoided since all of the injection is local. The ad blockers are avoided because the injection is in response to a request from the client 20 and appears as a legitimate response.

Remote Access

The monitoring and injection device 10 supports remote access capabilities for maintenance, control, traffic tunneling, or other purposes. This remote access may be accomplished through typical Virtual Private Network (VPN) technologies running over local wireless networks, or through an out-of-band network such as cellular through the cellular interface 38. It may be necessary to utilize tunneling over protocols such as DNS to accomplish a connection that is otherwise blocked, for seamless and persistent remote connection with the monitoring and injection device 10.

Wireless Protocols

The various descriptions herein make reference for illustration purposes to IEEE 802.11-based protocols with respect to the sensing and injection. While wireless IEEE 802.11-based protocols are the most immediate applicable protocol for the monitoring and injection devices 10 to utilize, it is not limited to that. The monitoring and injection devices 10 contemplate operation with any wireless protocol including, for example, Bluetooth, cellular and potentially other protocols, implemented via software defined radio or via hardware, or a combination.

Additional Functionality in the Monitoring and Injection Devices

The monitoring and injection devices 10 may also provide other services in addition to targeted communication. For example, the monitoring and injection devices 10 may also be used to detect traffic that is destined to malware sites and provide an alert to the end user, report, or take action to intervene, such as with a TCP reset or redirect, etc. They could also be used to detect other network security intrusions, network performance statistics, traffic statistics, and provide alerts, reports, or interventions. It could be used to manage traffic fairness, so that one user does not monopolize the bandwidth of other users on the shared medium. It could also be used to facilitate local user-to-user chats and broadcast messages as well, which may be particularly useful at that geography or nearby locations, or across a wide area as well. A virtual network and communication medium may be formed with one of these devices 10, with or without the use of external servers on the internet facilitating this type of communication. Thus, in addition to sensing an injection, the monitoring and injection devices 10 can provide additional functionality.

Exemplary Server Architecture

Referring to FIG. 5, in an exemplary embodiment, a block diagram illustrates a server 200 which may be used for the monitoring and injection server 12. The server 200 can be in the cloud, such as Software-as-a-Service, or the like. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Referring to FIG. 6, in an exemplary embodiment, a block diagram illustrates a mobile device 300, which may be used for the monitoring and injection device 10, the client 20, or the like. The mobile device 300 can be a digital device that, in terms of hardware architecture, generally includes a processor 302, input/output (I/O) interfaces 304, one or more radios 306, a data store 308, and memory 310. It should be appreciated by those of ordinary skill in the art that FIG. 6 depicts the mobile device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 300. Additionally, the I/O interfaces 304 may further include an imaging device, i.e. camera, video camera, etc.

The radios 306 enable wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. In an exemplary embodiment, the one or more radios 306 can be allocated different functions such as monitoring, injection, administrative access, etc.

In an exemplary embodiment, the monitoring and injection device 10 can have several radios 306, such as at least 10 and preferably 20+. For example, in a tradeshow use case or the like, there may be 20+ channels to monitor. In order to monitor all of these channels at the same time, the monitoring and injection device 10 can have a single wireless interface or radio 306 per channel monitored. The processor 302 can also include multiple processors to support multiple radios 306 simultaneously.

Also, there are no current software implementations of IEEE 802.11ac packet injection. To overcome this limitation, the monitoring and injection device 10 can include functionality based on reverse engineering IEEE 802.11ac adapters in such a way to provide raw access to the packets along with customer drivers. In an exemplary embodiment, for IEEE 802.11ac, the monitoring and injection device 10 can have 40+ radios with a radio 306 for monitoring and one for injecting on 20+ channels. Also, injection for IEEE 802.11ac clients 20 can be at lower IEEE 802.11n data rates to these clients 20.

The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 6, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In particular, the programs 316 can provide instructions to perform the various functions described herein with reference to the monitoring and injection device 10.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for providing targeted communications to clients operating over a wireless local area network (WLAN) in compliance with IEEE 802.11, the method comprising:

wirelessly sensing, with a monitoring and injection device in proximity with the WLAN and from outside an infrastructure of the WLAN, a client request sent from a client to an access point that is within the infrastructure of the WLAN;

analyzing, at least in part with the monitoring and injection device, the wirelessly sensed client request to determine a targeted communication to be injected for the client; and injecting the targeted communication as a raw packet that appears to originate from the WLAN infrastructure from the monitoring and injection device, in proximity to and within wireless communication range of the WLAN from outside the WLAN infrastructure, directly to the client.

2. The method of claim 1, further comprising:
constructing the raw packet in response to the client request such that the raw packet is received prior to a response to the client request from a Web server.

3. The method of claim 1, wherein the raw packet is an arbitrary message to a Web browser on the client when the Web browser is expecting a reply to a previously sent request.

4. The method of claim 1, wherein determining the targeted communication comprises:
analyzing historical client communications and client identity,
tracking past injection events, and
tracking present circumstances.

5. The method of claim 1, the method further comprising:
obtaining periodic configuration and synchronization data from one or more of a monitoring and injection server and at least one other monitoring and injection device,
wherein communication between the monitoring and injection device and the one or more of a monitoring and injection server and at least one other monitoring and injection device includes communication over a local network separate from the WLAN infrastructure.

6. The method of claim 1, wherein the raw packet uses one or more of Hypertext Transfer Protocol (HTTP), Transmission Control Protocol (TCP), JavaScript, Domain Name System (DNS), User Datagram Protocol (UDP), and Hypertext Markup Language (HTML).

7. The method of claim 1, wherein wirelessly sensing comprises at least one of sensing traffic on the WLAN as one or more of i) unencrypted, ii) encrypted with known keys, and iii) encrypted without the keys for the purposes of analytics, and monitoring and tracking identifying information of the clients comprising one or more of Media Access Control (MAC) address, browsing history, Internet Protocol (IP) traffic history, and cookies.

8. The method of claim 1, wherein the monitoring and injection device is configured to avoid injection attempts in response to determining the client is communicating with the WLAN to establish access to the WLAN.

9. The method of claim 1, wherein the raw packet is a response to a Hypertext Transfer Protocol (HTTP) GET request for a specific element of a Web page or the Web page itself, and wherein the targeted communication is an interstitial advertisement on the Web page.

10. A monitoring and injection device configured for providing targeted communications to clients operating over a wireless local area network (WLAN) in compliance with IEEE 802.11, the device comprising:
one or more wireless interfaces and a data store;
a processor communicatively coupled to the one or more wireless interfaces and the data store; and
memory storing instructions that, when executed, cause the processor to:
wirelessly sense, via the one or more wireless interfaces in proximity to the WLAN and from outside an infrastructure of the WLAN, a client request sent from a client to an access point that is within the infrastructure of the WLAN,
analyze the wirelessly sensed client request at least in part with the monitoring and injection device via an analysis engine in communication with the data store to determine a targeted communication to be injected for the client, and
cause injection of the targeted communication from the monitoring and injection device by the one or more wireless interfaces as a raw packet that appears to originate from the WLAN infrastructure, in proximity to and within wireless communication range of the WLAN outside the WLAN infrastructure, directly to the client.

11. The monitoring and injection device of claim 10, wherein the memory storing instructions that, when executed, further cause the processor to
construct the raw packet in response to the client request such that the raw packet is received prior to a response to the client request from a Web server.

12. The monitoring and injection device of claim 10, wherein the raw packet is an arbitrary message to a Web browser on the client when the Web browser is expecting a reply to a previously sent request.

13. The monitoring and injection device of claim 10, wherein the analysis engine performs analysis of historical client communications and client identity based on the sensing, tracking of past injection events, and present circumstance, and wherein the analysis is used to determine the targeted communication for the client.

14. The monitoring and injection device of claim 10, wherein the instructions, when executed, further cause the processor to
obtain periodic configuration and synchronization data from one or more of a monitoring and injection server and at least one other monitoring and injection device,
wherein communication between the monitoring and injection device and the one or more of a monitoring and injection server and at least one other monitoring and injection device includes communication over a local network separate from the WLAN infrastructure.

15. The monitoring and injection device of claim 10, wherein the raw packet uses one or more of Hypertext Transfer Protocol (HTTP), Transmission Control Protocol (TCP), and Hypertext Markup Language (HTML).

16. The monitoring and injection device of claim 10, wherein the monitoring and injection device is in a monitor mode which performs at least one of sensing the traffic on the WLAN as one or more of i) unencrypted, ii) encrypted with keys known by the monitoring and injection device, and iii) encrypted without the keys for the purposes of analytics, and sensing traffic with the one or more wireless interfaces configured to monitor and track identifying information of the clients comprising one or more of Media Access Control (MAC) address, browsing history, Internet Protocol (IP) traffic history, and cookies.

17. The monitoring and injection device of claim 10, wherein the memory storing instructions that, when executed, further cause the processor to avoid injection attempts in response to determining the client is communicating with the WLAN to establish access to the WLAN.

18. The monitoring and injection device of claim 10, wherein the raw packet is a response to a Hypertext Transfer Protocol (HTTP) GET request for a specific element of a Web page or the Web page itself, wherein the response is determined by the analysis engine, and wherein the targeted communication is an interstitial advertisement on the Web page.

19. A system configured for providing targeted communications to clients operating over one or more wireless local area networks (WLANs) in compliance with IEEE 802.11, the system comprising:
a monitoring and injection device deployed in proximity to the one or more WLANs; and a monitoring and injection server in communication with the monitoring and injection device;

wherein the monitoring and injection device is configured to wirelessly sense, in proximity to the WLAN and from outside an infrastructure of the WLANs, a client request sent from a client to an access point that is within the infrastructure of the one or more WLANs, analyze, at least in part at the monitoring and injection device, the wirelessly sensed client request to determine a targeted communication to be injected for the client, and inject the targeted communication as a raw packet that appears to originate from the WLAN infrastructure from the monitoring and injection device, in proximity to and within communication range of the one or more WLANs from outside the WLAN infrastructure, directly to the client.

20. The monitoring and injection system of claim 19, further comprising a plurality of monitoring and injection devices, including the monitoring and injection device, that are connected to one another in a mesh network that is separate from the WLAN infrastructure, and wherein each of the plurality of monitoring and injection devices is configured to obtain periodic configuration and synchronization data from one or more of the monitoring and injection server and at least one other monitoring and injection device.

* * * * *